Feb. 10, 1970  D. S. STACEY  3,494,199
MOLD TEMPERATURE MEASURING DEVICE
Filed Jan. 10, 1967  2 Sheets-Sheet 1

INVENTOR:
DAVID S. STACEY
BY: Campbell & Harris
ATTORNEYS

INVENTOR:
DAVID S. STACEY

United States Patent Office 3,494,199
Patented Feb. 10, 1970

3,494,199
MOLD TEMPERATURE MEASURING DEVICE
David S. Stacey, Carbondale, Colo., assignor to Ball Brothers Company Incorporated, Muncie, Ind., a corporation of Indiana
Filed Jan. 10, 1967, Ser. No. 608,384
Int. Cl. G01k 5/18, 5/52
U.S. Cl. 73—361
4 Claims

ABSTRACT OF THE DISCLOSURE

A mold temperature measuring device utilizing an iron-constantan thermocouple connected with an operational amplifier through a range selector, the amplifier being connected to a meter to indicate the temperature sensed by the thermocouple. Meter range is from 600° F. to 1100° F., and the thermocouple is inserted into an opening in a mold that has been filled with molten metal.

---

This invention relates to a temperature measuring device and more particularly to a device and method for accurately measuring the temperature of a mold such as a glass mold.

Measuring devices are well known in the art and have been utilized in many diverse fields, including the glass industry. Such devices have, however, not proved to be completely successful for many uses. In the glass field, for example, many attempts have heretofore been made to provide a useful and yet practical instrument, but heretofore known devices have been greatly limited at least partially by difficulties encountered due to inaccessibility and/or damage caused by operational hazards.

Control of mold temperature is shown to be important, by the fact that the heat extracted by a blank mold directly affects the formation of a glass article. If a parison is too hot, for example, it may deform during invert or have excessive sag in the blow mold during reheat. If the parison is too cold, on the other hand, checks may result or swung baffles due to sag may leave thin heels.

The heat extracted depends primarily on the mold temperature, duration of contact, and pressure of contact. Duration of contact is easily controlled and pressure is most generally fixed. At the present time, however, mold temperature is unknown, and the present practice is to raise or lower the mold temperature when defects occur. An experienced operator has learned that particular defects indicate too high or too low a temperature and adjusts the same accordingly.

Thus, if mold temperature can be established and a safe operating range designated, an operator would no longer have to depend upon the presence of defects to indicate that the mold temperature is no longer within the safe operating range. The difficulty in accomplishing this end is that mold temperature fluctuates in and around the mold. It has been found, however, that if the temperature is sensed substantially at the center of the mold, then an indication of all operating temperatures is achieved which will be meaningful and not subject to error in an unknown amount.

It has heretofore also been a problem to obtain such a measuring device having the necessary accuracy and durability for production use.

It is therefore an object of this invention to provide a durable and accurate temperature measuring device that is suitable for temperature measurement over a wide and, if desired, relatively high temperature range.

It is another object of this invention to provide an improved temperature measuring device for use in measuring mold temperatures with high accuracy.

It is still another object of this invention to provide a hand-held mold temperature measuring device utilizing an iron constantan thermocouple and an operational amplifier to achieve high accuracy.

It is still another object of this invention to provide a temperature measuring device suitable for measuring the temperature of the central portion of a mold to achieve meaningful temperature indications useful in maintaining the mold temperature within acceptable limits.

It is yet another object of this invention to provide a mold temperature measuring device for use in conjunction with a mold having an opening therein filled with molten metal with a relatively low melting point wherein the thermocouple is inserted into said molten metal to measure the temperature of the central portion of the mold.

With these and other objects in view, which will become apparent to one skilled in the art as the description proceeds, this invention resides in the novel construction, combination and arrangement of parts substantially as hereinafter described, and more particularly defined by the appended claims, it being understood that such changes in the precise embodiment of the hereindisclosed invention are meant to be included as come within the scope of the claims.

The accompanying drawings illustrate one complete embodiment of the invention according to the best mode so far devised for the practical application of the principles thereof, and in which.

Figure 1:
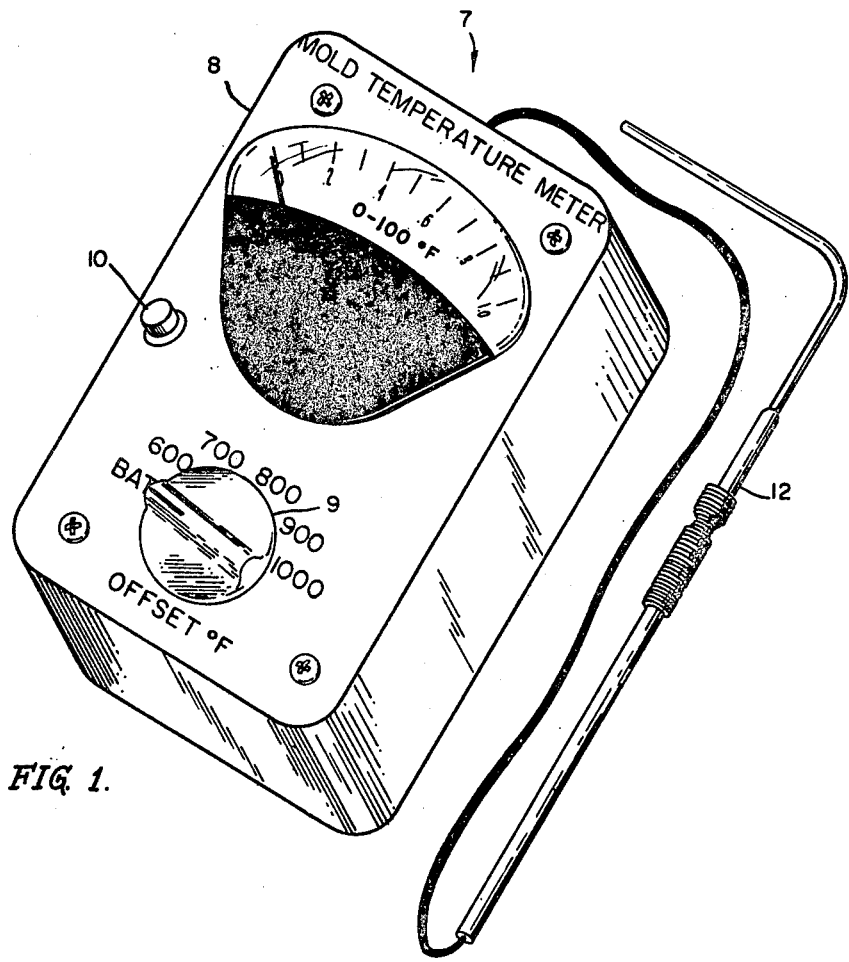
FIGURE 1 is a perspective view of the temperature measuring device of this invention.

Referring now to the drawings, the numeral 7 indicates generally the temperature measuring device of this invention. As shown in FIGURE 1, the temperature measuring device includes a meter 8 for providing a visual indication of the temperature measured. Two other external controls are also provided, a range selector 9 and a depressible switch control 10. As also shown in FIGURE 1, the range for the mold temperature measuring device is preferably from 600° F. to 1100° F. in increments of 100° F.

The transducer utilized is an iron constantan thermocouple 12, which is well known in the art. Iron constantan has an output such that 3.08 millivolts are equal to 100° F. with less than 1% error in the range between 600° F. and 1100° F.

Figure 2:
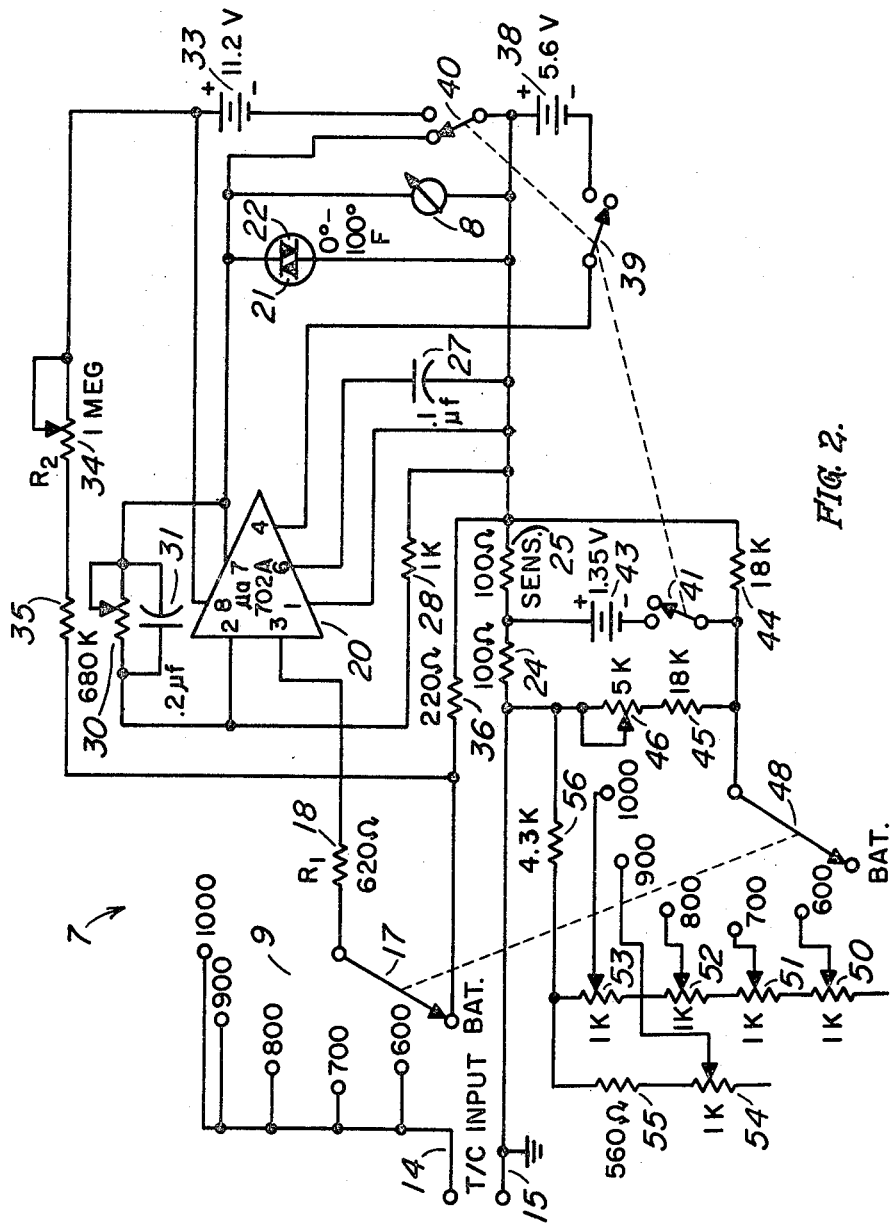
FIGURE 2 is a schematic drawing of the mold temperature measuring device of this invention.

As shown in FIGURE 2, the millivolt output from thermocouple 12 is connected to a mold temperature meter through leads 14 and 15, the latter of which is grounded and the former of which is connected in common to the five selectable ranges of the meter shown in FIGURES 1 and 2 (range of 600° F. to 1100° F.).

The rotor, or wiper, 17 of range selector switch 9 is connected through resistor 18 to input pin 3 of operational amplifier 20, as shown in FIGURE 2. Operational amplifier 20 is a millivolt amplifier to make the device independent of thermocouple resistance, and is preferably a solid state amplifier such as, for example, an operational amplifier produced by Fairchild and designated as a "Fairchild 702A," which amplifier includes nine transistors and has a nominal loop gain of 2600.

The output from amplifier 20 is taken from pin 7, as shown in FIGURE 2, and coupled to a conventional meter 8, which is a conventional 0–1 milliammeter.

Back-to-back diodes 21–22 are connected across the meter to prevent damage to the meter if overloading should occur. The amplifier common terminal (pin 1, as shown in FIGURE 2) is connected to ground through series-connected resistor 24 and sensitor 25. Current through sensitor 25 provides cold junction compensation, while the current through resistor 24 provides zeroing and temperature offsets for each each scale.

In addition, pin 4 of the amplifier is connected to sensitor 25 through capacitor 27, while pin 2 of the amplifier is connected to sensitor 25 through resistor 28. In addition, pins 2 and 7 of the amplifier are connected through variable resistor 30 and capacitor 31 connected in parallel with one another to provide feedback. Pin 8 of amplifier 20 is connected to battery 33, which provides +11.2 volts and is connected to sensitor 25 through variable resistor 34 and resistors 35 and 36, all of which are connected in series with one another. Pin 4 of amplifier 20 is connected to the negative side of battery 38 through switch 39 (which switch is controlled by a switch control 10). In addition, switch 39 is connected to move in unison with switches 40 and 41, with switch 40 being connected in one position across meter 8, and in the second, or closed position (that is, when switch control 10 is depressed) connects the positive side of battery 38 with battery 33 (when switch control 10 is depressed, switch 39 is also closed to complete the circuit to the amplifier from battery 38).

Switch 41 is likewise closed when switch control 10 is depressed to connect battery 43 into circuit. As shown in FIGURE 2, the positive side of battery 43 is connected to the junction of resistor 24 and sensitor 25, while the negative side is connected through switch 41 and resistor 44 to the other side of sensitor 25, and to the ground side of resistor 24 through resistor 45 and variable resistor 46, connected in series with one another. In addition, the junction of resistors 44 and 45 are connected to rotor 48 of the second half of range selector 9 (which could also be a second multiple contact switch the rotor of which is constrained to move in conjunction with rotor 17).

As shown in FIGURE 2, series-connected resistors 50–53 are connected in parallel with series-connected resistors 54 and 55. Temperature ranges are provided by connecting the fixed contacts engageable with rotor 48 to certain of these resistors, with each contact being connected with a separate resistor as shown in FIGURE 2. As also shown in FIGURE 2, resistor 50–55 are connected to the grounded side of resistor 24 through resistor 56.

Figure 3:
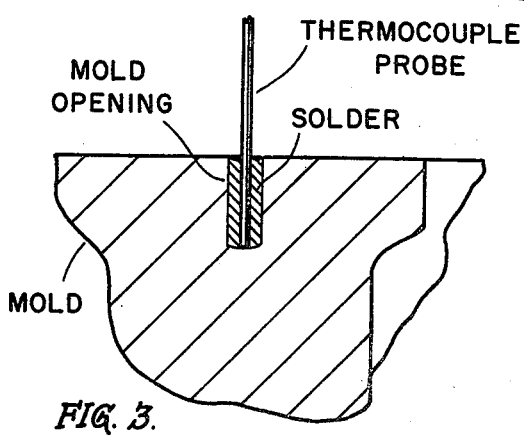
FIGURE 3 is a partially cut away view of a mold having an opening therein with molten metal in said opening and the thermocouple probe of said temperature measuring device inserted.

As shown in FIGURE 3, the temperature of the mold is sensed at the interior of each mold half to obtain the central temperature of the mold. This is accomplished by providing an opening in the mold into which a probe can be inserted. It has been found that a one-fourth inch diameter hole that is three and one-half inches deep in each mold half is satisfactory, and said hole should be centrally located which, for example, in some molds may be about 6 inches from the mold seam, such an arrangement having been used successfully for making gallon glass bottles.

The hole is filled with a relatively low melting point metal and the molten metal receives the thermocouple and provides good conduction.

In operation, a thermocouple, preferably on a handheld probe, is inserted into the molten lead metal, which is preferably lead (or solder), and switch control 10 is then depressed to connect power to the device (and more particularly to amplifier 20). The voltage obtained from the thermocouple is then translated in the mold meter circuit so that an indication of temperature at the central portion of the mold is indicated on meter 8. An accurate reading has been found to be obtainable in about 15 seconds. The range, or course, is selected by range selector 9 in 100° increments. In addition, a battery check is provided at selector range "Battery."

An improved temperature measuring device is thus provided which is especially well suited for measurement of the temperature at the central portion of a mold to obtain accurate and meaningful readings.

What is claimed is:

1. A mold temperature measuring device, comprising: an iron-constantan thermocouple adapted to be engageable with a mold to sense the temperature thereof; a range selector connected with said thermocouple for controlling selection of temperature ranges to be sensed by said device; an amplifier connected with said thermocouple through said range selector; a meter connected to said amplifier; range compensation means including cold junction compensation means connected with said amplifier through said range selector; a feedback network connected across said amplifier for gain stabilization; back-to-back diodes connected across said meter to protect the same against overloading; power means; and switching means for controlling the application of power to said device, said switching means when in one position causing said power to be applied so that the temperature sensed by said thermocouple is indicated on said meter, and said switching means when in the second position causing said meter to be shorted and said power means effectively disconnected from the remainder of said device.

2. A mold temperature measuring device, comprising: an iron-constantan thermocouple adapted to be engageable with a mold to sense the temperature thereof, said thermocouple being inserted in openings in said mold, said openings being filled with molten metal of relatively low melting point to insure good contact; a range selector for controlling selection of temperature ranges to be sensed by said device; a millivolt amplifier connected with said thermocouple through said range selector; a meter connected to said amplifier; range compensation means including cold junction compensation means connected with said amplifier through said range selector; power means; and switching means for controlling the application of power to said device, said power when applied causing the temperature sensed by said thermocouple to be indicated on said meter.

3. A hand-held mold temperature measuring device, comprising: an iron-constantan thermocouple having probes adapted for insertion in openings in a mold for measuring central mold temperature; a range selector for selecting a range of temperatures within the range from 600° F. to 1100° F., said selector being connected to said thermocouple to receive the voltage output therefrom; an operational amplifier connected to said selector; a compensation network including a sensitor connected to said amplifier; a feedback network connected across said amplifier for gain stabilization; a meter connected to receive the output from said amplifier; back-to-back diodes connected across said meter to protect the same against overloading; power supply means; and switching means connecting said power supply to said device and connected across said meter so that said switching means in one position shorts said meter and effectively disconnects said power supply from said device and in a second position connects siad power supply to said device and allows said meter to indicate the temperature sensed by said thermocouple.

4. A method for measuring mold temperature, comprising: providing an opening to the interior of a mold; filling said opening with a relatively low melting point metal in molten state; inserting a transducer into said mold opening while said molten metal is in said molten state and obtaining therefrom a voltage indicative to the sensed temperature at the interior of said mold; and translating said voltage to a temperature reading that is substantially free of surface temperature variations of said mold.

(References on following page)

References Cited

UNITED STATES PATENTS

| | | | |
|---|---|---|---|
| 1,363,267 | 12/1920 | Porter | 73—359 |
| 2,210,583 | 8/1940 | Henry | 65—162 |
| 2,277,365 | 3/1942 | Michael | 73—361 XR |
| 2,368,937 | 2/1945 | McGillin | 73—359 XR |
| 2,789,254 | 4/1957 | Bodle et al. | |
| 2,861,239 | 11/1958 | Gilbert | 73—359 XR |
| 3,082,625 | 3/1963 | Zimmerman. | |
| 3,085,436 | 4/1963 | Huddleston | 73—361 |
| 3,321,973 | 5/1967 | Anderson | 73—359 |
| 3,372,017 | 3/1968 | Pitbladdo | 65—162 |

OTHER REFERENCES

Phelps, J. W.: Electrical Protection . . . , in Bell Laboratories Record, vol. 36, pp. 247–9 (page 249 relied upon), July 1958.

LOUIS R. PRINCE, Primary Examiner

F. SHOON, Assistant Examiner

U.S. Cl. X.R.

65—29, 162; 164—4